Oct. 24, 1933.  P. H. D'AMOUR  1,931,885
RESONANCE BOX
Filed Oct. 30, 1923   5 Sheets-Sheet 3

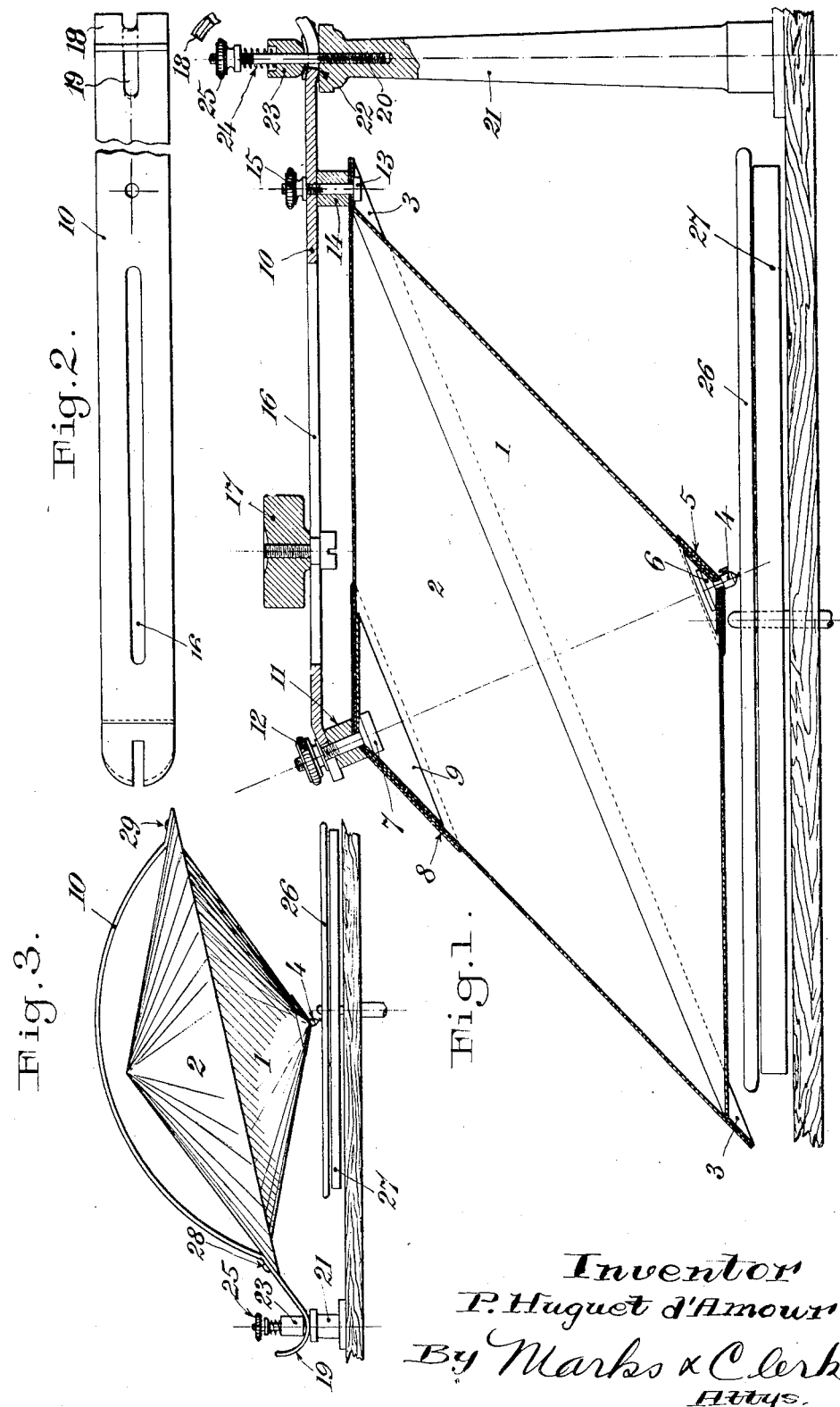

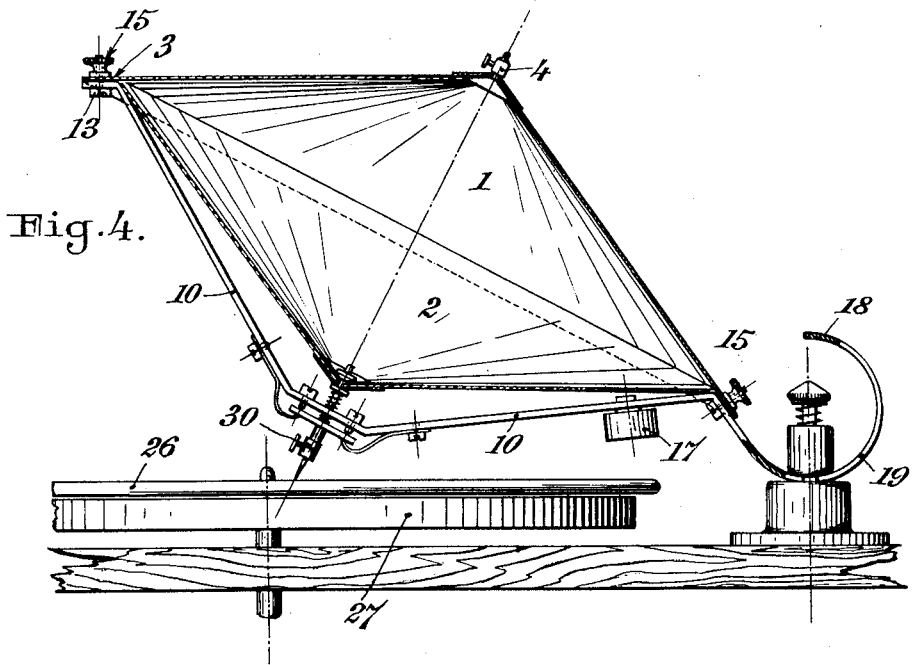
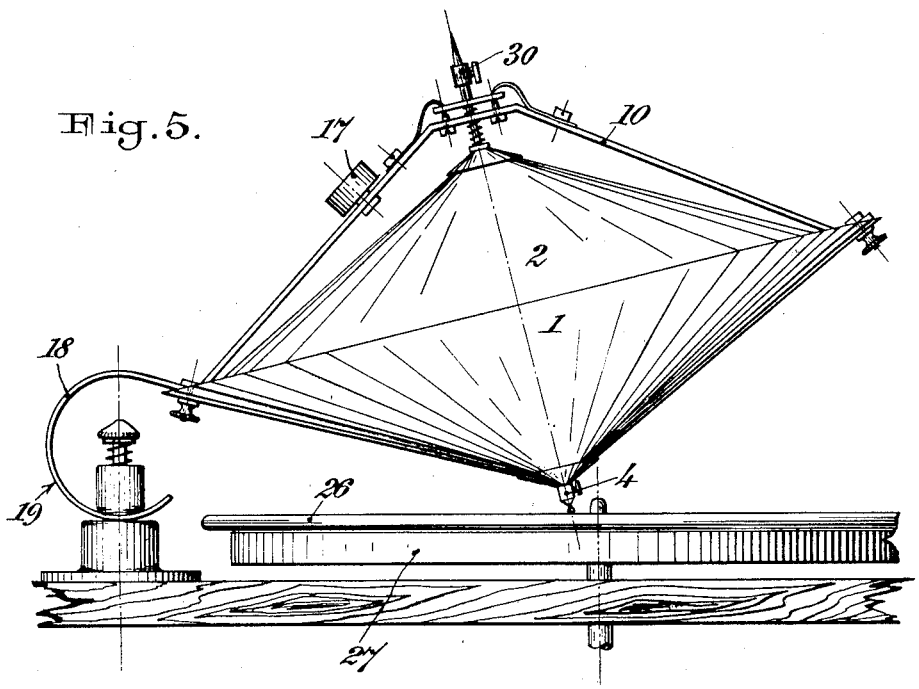

Inventor
P. Huguet d'Amour
By Marks & Clerk
Attys.

Oct. 24, 1933.     P. H. D'AMOUR     1,931,885
RESONANCE BOX
Filed Oct. 30, 1923     5 Sheets-Sheet 4
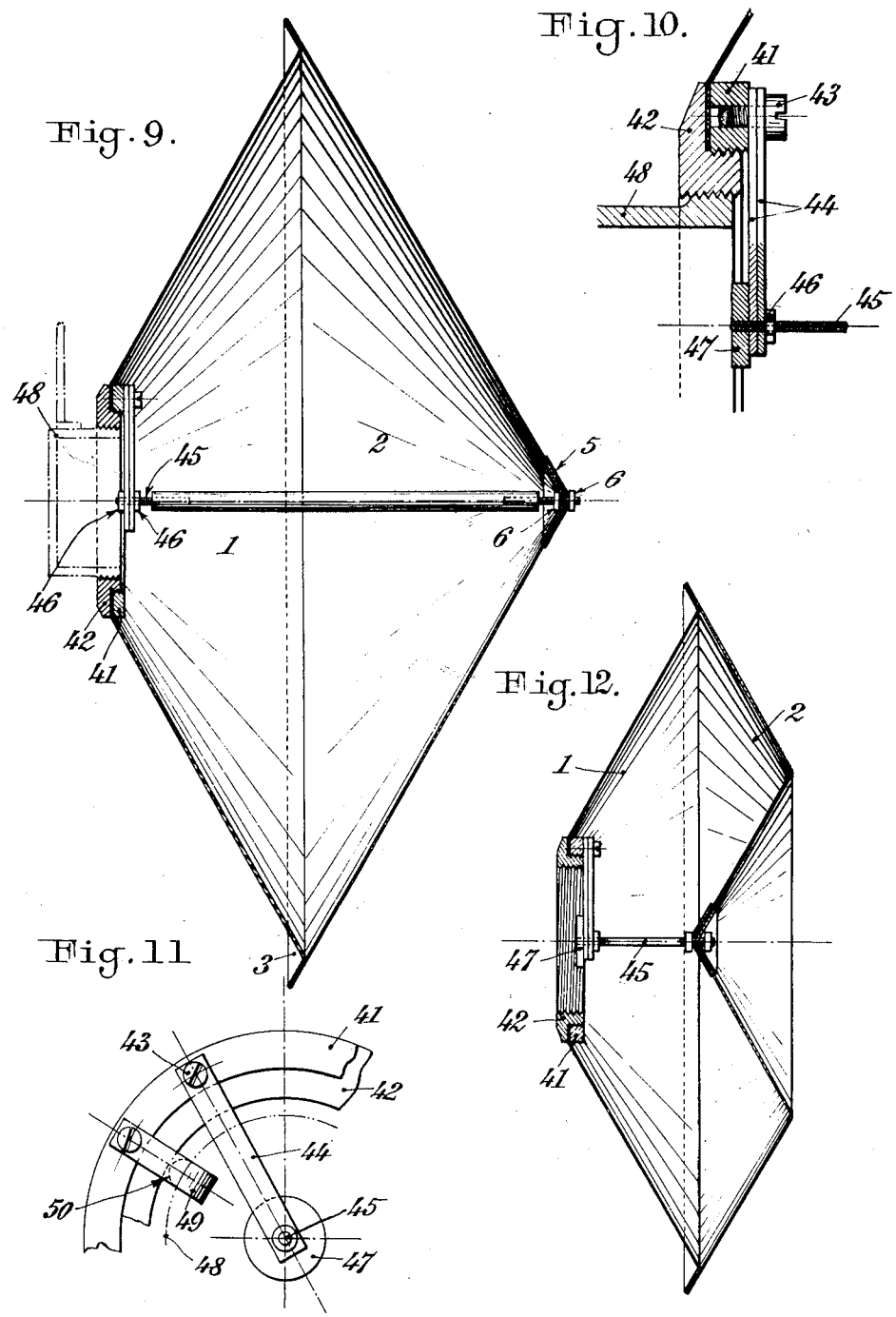
Inventor
P. Huguet d'Amour
By Marks & Clerk
Attys.

Patented Oct. 24, 1933

1,931,885

UNITED STATES PATENT OFFICE 1,931,885

RESONANCE BOX

Paul Huguet d'Amour, Paris, France, assignor to Western Electric Company, Incorporated, New York, N. Y., a corporation of New York Application October 30, 1923, Serial No. 671,756, and in France November 6, 1922

9 Claims. (Cl. 181—31)

My invention relates to a resonance box more specially intended for the recording, amplifying and true reproduction of sound vibrations. Said box is formed by conical walls and more particularly two hollow cones preferably of thick paper, assembled at their bases, said resonance box being provided with a vibration transmitting device and suitable supporting means.

In the accompanying drawings which illustrate by way of example different embodiments of the invention:

Figure 1 is an axial section of a resonance box which is adapted for audition on a phonographic disc with vertical prints;

Figure 2 is a plan view of the suspension lever;

Figure 3 is an elevation of another embodiment;

Figures 4 and 5 are respectively a section and an elevation of another embodiment in which the apices of the cones are provided the one with a sapphire-holder and the other with a needle-holder;

Figure 9 is another embodiment of the resonance box;

Figures 10 and 11 show details of Figure 9;

Figures 12 to 14 show modified forms of Figure 9;

Figure 6:
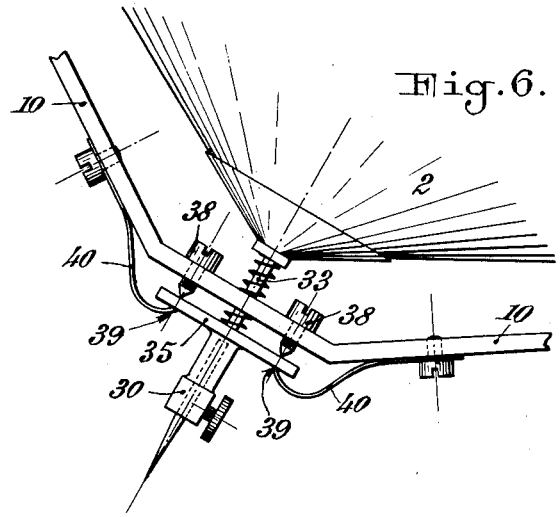
Figure 6 is an elevation at an enlarged scale of a needle-holder mounted on the suspension arm.

The cones 1 and 2 are assembled at their bases 3. The apex of cone 1 is provided with a sapphire-holder 4 which is advantageously attached thereto by a conical washer 5 and a nut 6. A bolt 7, placed at the apex of cone 2 which is reinforced by two conical washers 8 and 9, serves as an attachment for the supporting lever 10. Bolt 7 is attached to the apex of cone 2 by a nut 11. A tightening bolt 12 connects the resonance box with the lever 10. Said lever is moreover attached to the assembling edge 3 of the two cones 1 and 2 by a bolt 13, a distance tube 14 and a nut 15. The lever, which comprises advantageously a slot 16 in which a counterweight 17 is movable, is curved at its free end 18 and is provided with a longitudinal slot 19. The lever 10 is engaged by its slot 19 on a threaded stem 20 mounted on a standard 21 which is terminated by a plane surface 22 against which the rounded part 18 of lever 10 rests. On the threaded stem and above the lever 10 is arranged a distance tube 23 rounded at its basis, a spiral spring 24 and a tightening nut 25.

In the embodiment shown in Figure 3 the lever 10 is attached to two diametrically opposite points 28, 29 of the assembling edge 3 of the two cones 1, 2.

Figure 7:
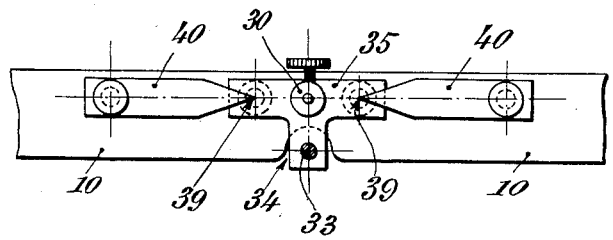
Figure 7 is a view from below of the needle-holder.
Figure 8:
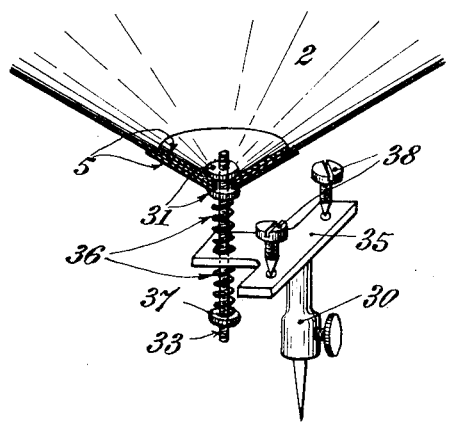
Figure 8 is a perspective view of the mounting of the needle-holder, the suspension arm being omitted and the cone being in section along its axis.

In the embodiment shown in Figures 4 and 5 the cone 1 is provided at its apex with a sapphire-holder 4 which is fixed thereto for instance as in Figures 1 and 3. The cone 2 itself is provided with a needle-holder 30 which is mounted thereon preferably as follows: a threaded stem is secured at the apex of cone 2 by two nuts 31 and two washers 5 (Figure 8) said stem passing freely in a slot 34 (Figure 7) formed in the suspension arm 10 and through a plate 35 on which a needle-holder 30 is placed. The stem 33 is surrounded by two spiral springs 36 which rest the one against the outer nut 31 and plate 35, and the other between said plate and a nut 37 which serves to regulate the tension of springs 36. The suspension arm 10 bears two screws 38 ending in a point against the end of which plate 35 is pressed by the points 39 of two flat springs 40 which are connected with the arm 10, for instance by means of screws. The points 39 are preferably placed directly opposite the points of the screws 38. In this manner the plate 35 transmits to the resonance box (1, 2) through springs 36 and stem 33 the slightest vibrations which are transmitted to the needle-holder 30 during audition with a disc with lateral prints (Figure 4).

The curved end 18 of the suspension arm 10 and also the slot 19 are long enough for the resonance box to be able to permit, by simple reversal, successively audition on a disc with lateral prints (Figure 4), then audition on a disc with vertical prints (Figure 5).

Owing to the mounting of lever 10, the resonance box may be directed to any horizontal position, it can also be raised the amount desired so as to occupy a position of steady equilibrium.

As the supporting device of the box (1, 2) allows the latter to move in all directions, the sapphire or the needle will follow all the sinuosities imparted to a disc 26 resting on the plate 27 of a phonograph and will therefore reproduce all the sounds recorded thereon.

The resonance box could conversely be used to record sounds and vibrations on discs or cylinders by simply replacing the sapphire or needle respectively by a spade or a style engraving direct on wax.

In the embodiment shown in Figure 9 the resonance box, (1, 2) according to the invention, is provided to serve as a telephonic loud-speaker. To this end the apex of one of the two cones, 1 for instance, is removed, the edges of the opening thus formed in the wall of cone 1 are fastened between two rings 41, 42 which can advantageously screw one on the other. On the ring 41 are fixed, by one or more screws 43, two or more blades 44 of different materials which are directed towards the center of the rings 41 and 42 and perforated at said center to allow the passage of a threaded stem 45 which is held in position by a nut 46 and an iron washer without hysteresis 47 (Figures 10 and 11) serving both as a nut and electro-magnet armature. Said threaded washer 47 and the first outer blade 44 may be integral. In such case the stem 45 is tightened on the blades 44 by two nuts 46 (Figure 9). The threaded stem 45 is moreover fixed to the apex of cone 2 by two conical washers 5 and two nuts 6. It may be threaded only at its ends and even formed of several different materials assembled together.

The blades 44 are preferably formed of different materials, which considerably reduces their own vibrations and therefore eliminates eddy vibrations.

For hearing at a distance any telephone transmission with the resonance box (1, 2) according to the invention, it is sufficient to screw the box by its washer 42 on a telephone receiver 48 from which the cap and the vibratory plate have been previously removed. Regulation of the intensity of sound is effected by screwing or unscrewing said washer 42 so as to approach or remove the armature 47 from the pole pieces of the electromagnet of the receiver.

To do away with the play which may exist between the ring 42 and the receiver 48, it is advisable to fix on the inner ring 41 one or more springs 49 the free end 50 of which is curved and presses against the receiver 48 (Figure 11).

In Figure 12 is a modified form of Figure 9 in which the apex of cone 2 is inverted into the interior of said cone. A box is thus obtained having the qualities of resonance of Figure 9 while possessing the advantages of a smaller volume, easier transportation, greater resistance and more elegant aspect.

Figure 13:
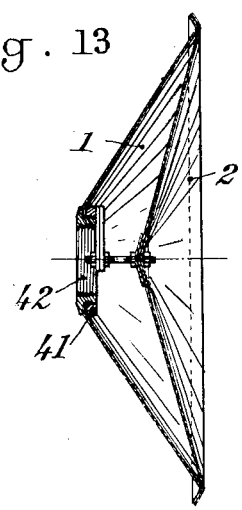

According to Figure 13 cone 2 enters entirely inside cone 1.

Figure 14:
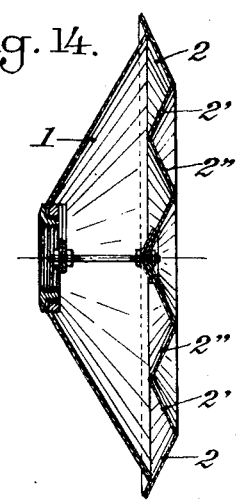

In Figure 14 one of the cones is replaced by a series of conical walls 2 2' 2'' . . . which are rigidly assembled together forming a sharp angle and not rounded. Any rounding would have the serious inconvenience of giving too much resiliency to the resonance box and would therefore reduce the intensity of sounds in the same ratio.

It should be noted that in all the embodiments of the resonance box whether formed of two or more conical walls, its walls are always assembled rigidly and with sharp angles.

It is obvious that each of the two cones may be replaced by several conical cones assembled with sharp angles.

Figure 15:
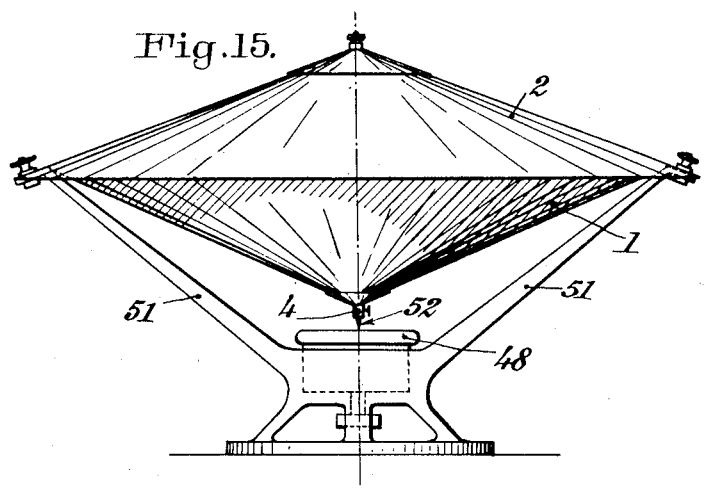
Figures 15 and 16 illustrate other embodiments.

Figure 15 shows that the resonance box of Figure 1 may also serve as a loud-speaker. To this end the box (1, 2) is fixed at its periphery on arms 51 which meet on the support of a controllable telephone receiver 48. The sapphire-holder 4 is provided with a stem 52 which rests against the membrane or armature of the telephone receiver 48. Said stem 52 instead of resting on the membrane or armature may be integral therewith.

Figure 16:
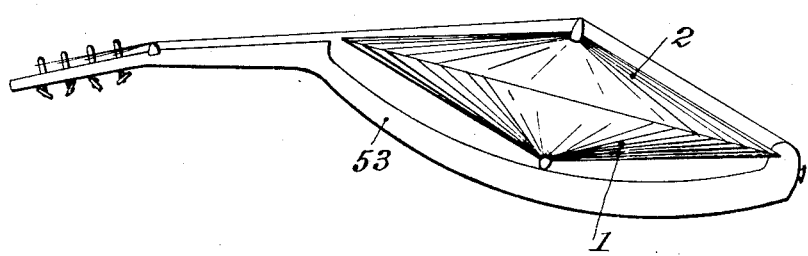

In Figure 16 the resonance box (1, 2) is arranged in place of the usual resonance box of a musical instrument with strings; it is attached in any suitable manner on the casing 53 of said instrument. In such case the box (1, 2) is preferably wooden and of little thickness, laminated or not.

The resonance box according to the invention may serve for recording, amplifying or the true reproduction of sound vibrations. It presents over diaphragms with amplifying pavilions or conical tympans opened to free air, the advantages of being of a very simple construction, low cost price, and of giving a sound of very great pureness. It is moreover very light without being brittle. It may be still lighter by providing holes in the walls, or stronger by reinforcing the walls by webs or corrugations along generatrices following parallels to the assemblage bases of the cones.

Said conical walls are generally made of thick paper varnished or waxed, but they may be obtained with any other material, such as laminated wood, parchment, celluloid, etc.

Numerous modifications of detail may be made in the construction of the resonance box without changing the principle of the invention. In particular the embodiments of the loud-speaker shown may be utilized with phonographs, and conversely, with suitable modifications. Similarly, the armature 47 may be replaced, according to the telephone receiver employed by a reel of fine insulated wire. The blades 44, instead of stopping at the center, may be longer so as to be fixed at two diametrically opposite points on the ring 41. Similarly also, the box (1, 2), instead of being supported by arms 51 (Fig. 15) fixed on the edges of the two cones, may be advantageously suspended only by the apex of the cone 2, which would give the sounds greater intensity.

What I claim is:

1. An acoustic device comprising two conical diaphragms, one of which is truncated and the other full, the latter having a flatter slope than and being nested in the former and both being peripherally sealed together providing therebetween a comparatively small air chamber, and actuating means for said diaphragms, said air chamber being provided to produce a high quality of tone.

2. An acoustic device comprising a sound radiator consisting of a plurality of conoidal members joined at their edges, the smaller end of one of the conoidal members being invertantly disposed within another of said members, a base member to which one of the conoidal members is secured, and a driving means attached to another of said conoidal members.

3. A sound reproducing device comprising a vibratile conical member and a vibratile frustro-conical member united at their bases, apertured members comprising the sole support for said members secured to said frustro-conical member, a vibratile member positioned in said aperture and fixed to said apertured members, a rod connecting said vibratile member and said conical member, and means secured to said apertured members for imparting vibrational forces to said vibratile member.

4. A sound reproducer comprising a conical member and a frustro-conical member united at their bases, apertured members for supporting said first and second named members secured to the frustro-conical member, a vibratile member secured to said apertured members, a rod connecting said vibratile member and said conical member, means for imparting vibrational forces to said vibratile member, and an adjustable casing for said means for varying the distance between said means and said vibratile member.

5. A sound reproducer comprising a conical member and a frustro-conical member united at their bases, apertured members for supporting said members, one of said members having threads, a vibratile member secured to said apertured members, a rod connecting said vibratile member and said conical member, a device for imparting vibrational forces to said vibratile member, and a casing for said device located in the opening of said apertured members and having threads thereon for varying the distance between the device and the vibratile member.

6. A sound reproducing device comprising a plurality of conical shaped members joined together at their bases, one of said members having a conical shaped reentrant portion, and a support for said members, of less diameter than the diameter of the base of said members, common to said members.

7. A sound reproducing device comprising a conical shaped member having a portion of its surface in the form of a reentrant cone and a frustro-conical shaped member, united at their bases, and means connected to the frustro-conical member at its smaller portion constituting the sole support for said members.

8. A sound reproducing device comprising two dish shaped members joined together at their bases, one of said members having an aperture therein, means connected to said one member at its aperture for supporting said members, and means connected to a point in the surface of said other member and mounted in said aperture for vibrating said members, said means substantially closing said aperture.

9. In an acoustical device, a diaphragm, a flexible support secured thereto adjacent its periphery and having a central opening, the diameter of which is less than the width of the support from its periphery to the edge of said opening, said support combining with the diaphragm to form a resonance chamber therebetween, a ring secured to the flexible support adjacent to and surrounding the opening therein and forming an entrance to said resonance chamber, and means carried by said ring in the entrance formed thereby and connected to said diaphragm for vibrating the same.

PAUL HUGUET D'AMOUR.